(12) United States Patent
Smith et al.

(10) Patent No.: US 11,548,655 B2
(45) Date of Patent: Jan. 10, 2023

(54) SYSTEM AND METHOD OF PROTECTION OF AIRCRAFT FROM FOREIGN OBJECT STRIKES

(71) Applicant: Bell Helicopter Textron Inc., Fort Worth, TX (US)

(72) Inventors: Michael Smith, Colleyville, TX (US); Cheng-Ho Tho, Colleyville, TX (US); Anand Kumar Marimuthu, Bangalore (IN)

(73) Assignee: TEXTRON INNOVATIONS INC., Providence, RI (US)

( * ) Notice: Subject to any disclaimer, the term of this patent is extended or adjusted under 35 U.S.C. 154(b) by 871 days.

(21) Appl. No.: 16/102,229

(22) Filed: Aug. 13, 2018

(65) Prior Publication Data

US 2020/0047915 A1  Feb. 13, 2020

(51) Int. Cl.
*B64D 45/00* (2006.01)
*B64C 1/12* (2006.01)
*B64C 1/00* (2006.01)

(52) U.S. Cl.
CPC .......... *B64D 45/00* (2013.01); *B64C 1/12* (2013.01); *B64C 2001/0072* (2013.01); *B64D 2045/0095* (2013.01)

(58) Field of Classification Search
CPC .......... B64C 1/12; B64C 1/14; B64C 1/1407; B64C 1/1461; B64C 2001/0072; B64D 45/00; B64D 2045/0095
See application file for complete search history.

(56) References Cited

U.S. PATENT DOCUMENTS 1,939,599 A  12/1933  Ragsdale
5,377,934 A  1/1995  Hill
(Continued)

FOREIGN PATENT DOCUMENTS

CN  108248814 A  7/2018

OTHER PUBLICATIONS

European Patent Office, European Search Report for EP Appl. No. 19191285.6 dated Jan. 13, 2020, 4 pp.
(Continued)

*Primary Examiner* — Assres H Woldemaryam
*Assistant Examiner* — Aaron M Rodziwicz
(74) *Attorney, Agent, or Firm* — Edwin S. Flores; Daniel J. Chalker; Chalker Flores, LLP

(57) ABSTRACT

An aircraft structure protected from collisions with foreign objects includes a first support proximate to an aircraft structure root; first sheets attached to the first support to form a first leading edge portion of the aircraft structure; a second support proximate to an outer end of the aircraft structure; second sheets attached to the second support to form a second leading edge portion; and a door including one or more ribs disposed between the first and second supports and configured to give shape to a third leading edge portion of the aircraft structure; and third sheets, attached to the ribs to form the third portion of the leading edge; wherein the first support, the first sheets, the second support, the second sheets, the one or more ribs, and the third sheets are disposed to mitigate damage from a foreign object collision by absorbing kinetic energy from a collision.

20 Claims, 7 Drawing Sheets

(56) References Cited

U.S. PATENT DOCUMENTS

| | | | | |
|---|---|---|---|---|
| 5,529,263 A * | 6/1996 | Rudolph | ................ | B64C 30/00 |
| | | | | 244/15 |
| 2008/0302919 A1 * | 12/2008 | Hoffenberg | ............... | B64C 9/12 |
| | | | | 244/214 |
| 2010/0148007 A1 * | 6/2010 | Manz | ....................... | B64C 5/02 |
| | | | | 244/123.1 |
| 2014/0263855 A1 * | 9/2014 | Ross | ................... | B64C 29/0033 |
| | | | | 244/7 A |
| 2016/0160681 A1 * | 6/2016 | Roach | .................. | F04D 29/322 |
| | | | | 415/177 |
| 2018/0216379 A1 * | 8/2018 | Spoelstra | ................. | E05D 3/14 |

OTHER PUBLICATIONS

European Patent Office, Communication pursuant to Article 94(3) EPC for EP Appl No. 19191285.6 dated Feb. 19, 2020, 4 pp.

* cited by examiner

SYSTEM AND METHOD OF PROTECTION OF AIRCRAFT FROM FOREIGN OBJECT STRIKES

CROSS-REFERENCE TO RELATED APPLICATIONS

Not applicable.

STATEMENT OF FEDERALLY FUNDED RESEARCH

Not applicable.

TECHNICAL FIELD OF THE INVENTION

The present invention relates in general to the field of protection of aircraft components, and more particularly, to protection of aircraft components from damage from foreign object strikes.

BACKGROUND OF THE INVENTION

Without limiting the scope of the invention, its background is described in connection with rotorcraft tail fins.

Aircraft in flight risk damage from collisions with foreign objects such as birds. Safety and flightworthiness considerations and governmental regulations (e.g., 14 CFR § 29.631 of the U.S. Federal Air Regulations) require that aircraft be able to continue to operate when bird strikes occur.

Of particular concern are aircraft structures such as wings, wing members, horizontal and vertical stabilizers, and tail fins, especially those with important equipment enclosed within the leading edge area of the structure. One important example of this is a rotorcraft tail fin containing a tail rotor shaft within the leading edge area, making the shaft susceptible to collision damage if not adequately protected.

A traditional approach for protection of a tail fin leading edge, and the tail rotor shaft within it, uses a single sheet metal or composite sandwich cover. This typically results in a relatively heavier design that is often not effective in protecting the tail rotor shaft. Another approach is to reposition the shaft behind the structural spar and to enclose it within the structure of the vertical fin; however, this makes inspection and maintenance of the shaft difficult for the helicopter maintainer. A device and method for improving protection of aircraft structures from damage from collisions with foreign objects is desirable.

SUMMARY OF THE INVENTION

In some embodiments of the disclosure, an aircraft structure protected from collisions with foreign objects includes a first support proximate to a root of the aircraft structure; one or more first sheets comprising a first material and attached to the first support to form a first portion of a leading edge of the aircraft structure; a second support proximate to an outer end of the aircraft structure; one or more second sheets comprising a second material and attached to the second support to form a second portion of the leading edge; and a door including one or more ribs disposed between the first support and the second support and configured to give shape to a third portion of a leading edge of the aircraft structure; and one or more third sheets comprising a third material, attached to the ribs to form the third portion of the leading edge; wherein the first support, the one or more first sheets, the second support, the one or more second sheets, the one or more ribs, and the one or more third sheets are disposed to mitigate damage from a collision with a foreign object by absorbing kinetic energy from a collision. In one aspect, the structure is a tail fin, a vertical stabilizer, a horizontal stabilizer, a wing, a winglet, a canard, a rotor blade, or a propeller blade. In another aspect, the one or more ribs comprise aluminum, steel, titanium, or composite. In another aspect, the one or more ribs comprise at least one T-rib, L-rib, C-rib, or D-rib. In another aspect, the first material comprises aluminum, steel, titanium, or composite. In another aspect, the second material comprises aluminum, titanium, steel, or composite. In another aspect, the third material comprises aluminum, titanium, steel, or composite.

In some embodiments of the disclosure, a rotorcraft includes a fuselage; one or more engines coupled to the fuselage; and an aircraft structure protected from collisions with foreign object impacts, coupled to the fuselage and including: a first support proximate to a root of the aircraft structure; one or more first sheets comprising a first material and attached to the first support to form a first portion of a leading edge of the aircraft structure; a second support proximate to an outer end of the aircraft structure; one or more second sheets comprising a second material and attached to the second support to form a second portion of the leading edge; and a door including: one or more ribs disposed between the first support and the second support and configured to give shape to a third portion of a leading edge of the aircraft structure; and one or more third sheets comprising a third material, attached to the ribs to form the third portion of the leading edge; wherein the first support, the one or more first sheets, the second support, the one or more second sheets, the one or more ribs, and the one or more third sheets are disposed to mitigate damage from a collision with a foreign object by absorbing kinetic energy from a collision. In one aspect, the aircraft structure is a tail fin, a vertical stabilizer, a horizontal stabilizer, a wing, a winglet, a canard, a rotor blade, or a propeller blade. In another aspect, the door at least partly encompasses a space occupied by a rotor shaft. In another aspect, the one or more ribs comprise aluminum, steel, titanium, or composite. In another aspect, the one or more ribs comprise at least one T-rib, L-rib, C-rib, or D-rib. In another aspect, the first material comprises aluminum, steel, titanium, or composite. In another aspect, the second material comprises aluminum, steel, titanium, or composite. In another aspect, the third material comprises aluminum, steel, titanium, or composite.

In some embodiments of the disclosure, a method of protecting an aircraft structure from collisions with foreign objects includes providing the aircraft structure; attaching to the aircraft structure a first support proximate to a root of the aircraft structure; attaching one or more first sheets comprising a first material to the first support to form a first portion of a leading edge of the aircraft structure; attaching a second support proximate to an outer end of the aircraft structure; attaching one or more second sheets comprising a second material and attached to the outer support to form a second portion of the leading edge; and attaching a door including: one or more ribs disposed between the first support and the second support and configured to give shape to a third portion of a leading edge of the aircraft structure; and one or more third sheets comprising a third material, attached to the ribs to form the third portion of the leading edge; wherein the first support, the one or more first sheets, the second support, the one or more second sheets, the one or more ribs, and the one or more third sheets are disposed to mitigate damage from a collision with a foreign object by absorbing kinetic energy from a collision. In one aspect, the aircraft structure is a tail fin, a vertical stabilizer, a horizontal stabilizer, a wing, a winglet, a canard, a rotor blade, or a propeller blade. In another aspect, the one or more ribs comprise aluminum, steel, titanium, or composite. In another aspect, the one or more ribs comprise at least one T-rib, L-rib, C-rib, or D-rib. In another aspect, the first material comprises aluminum, steel, titanium, or composite. In another aspect, the second material comprises aluminum, titanium, steel, or composite. In another aspect, the second material comprises aluminum, titanium, steel, or composite.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
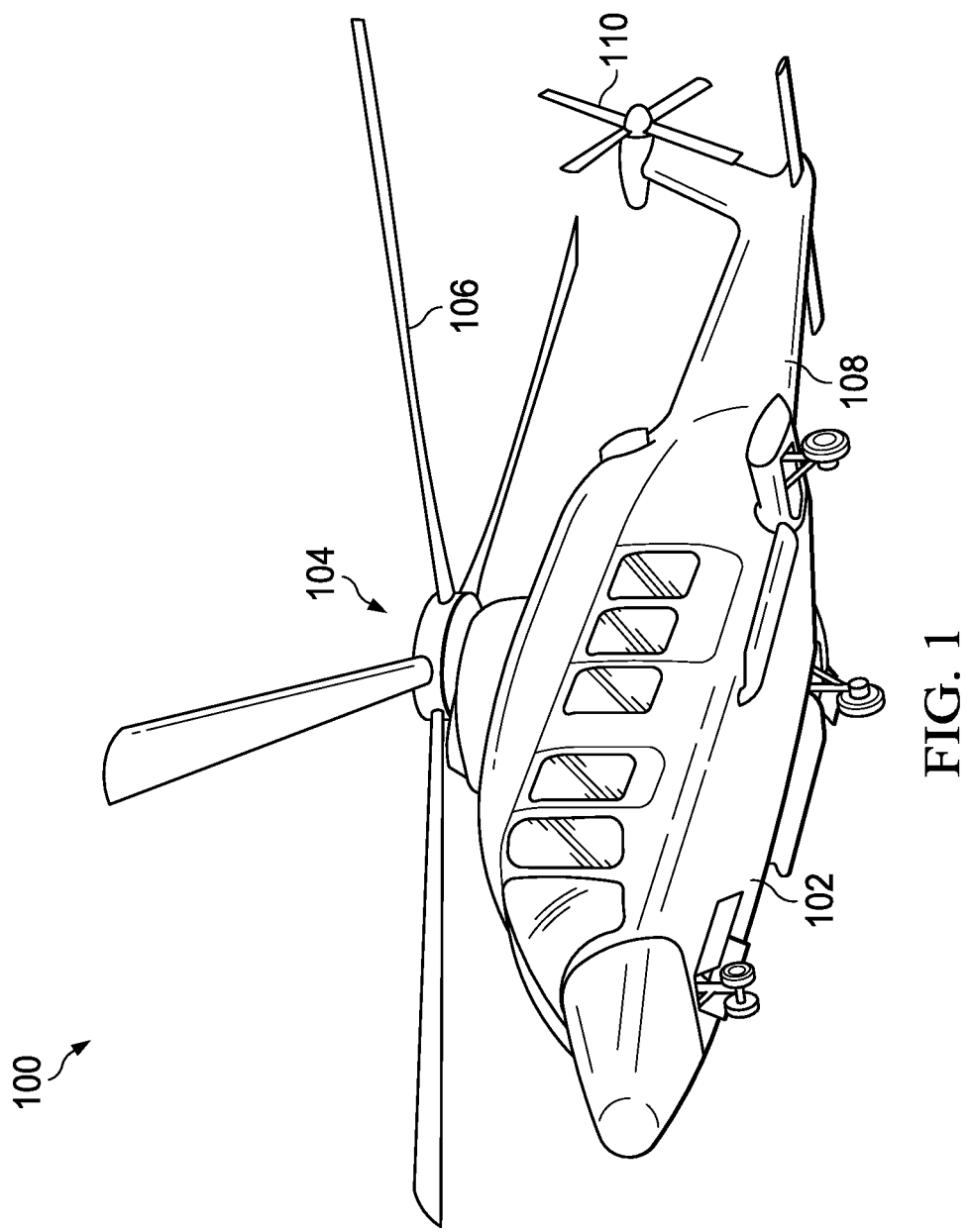
FIG. 1 shows a side view of a helicopter according to a particular embodiment of the present application.

FIG. 1 shows an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
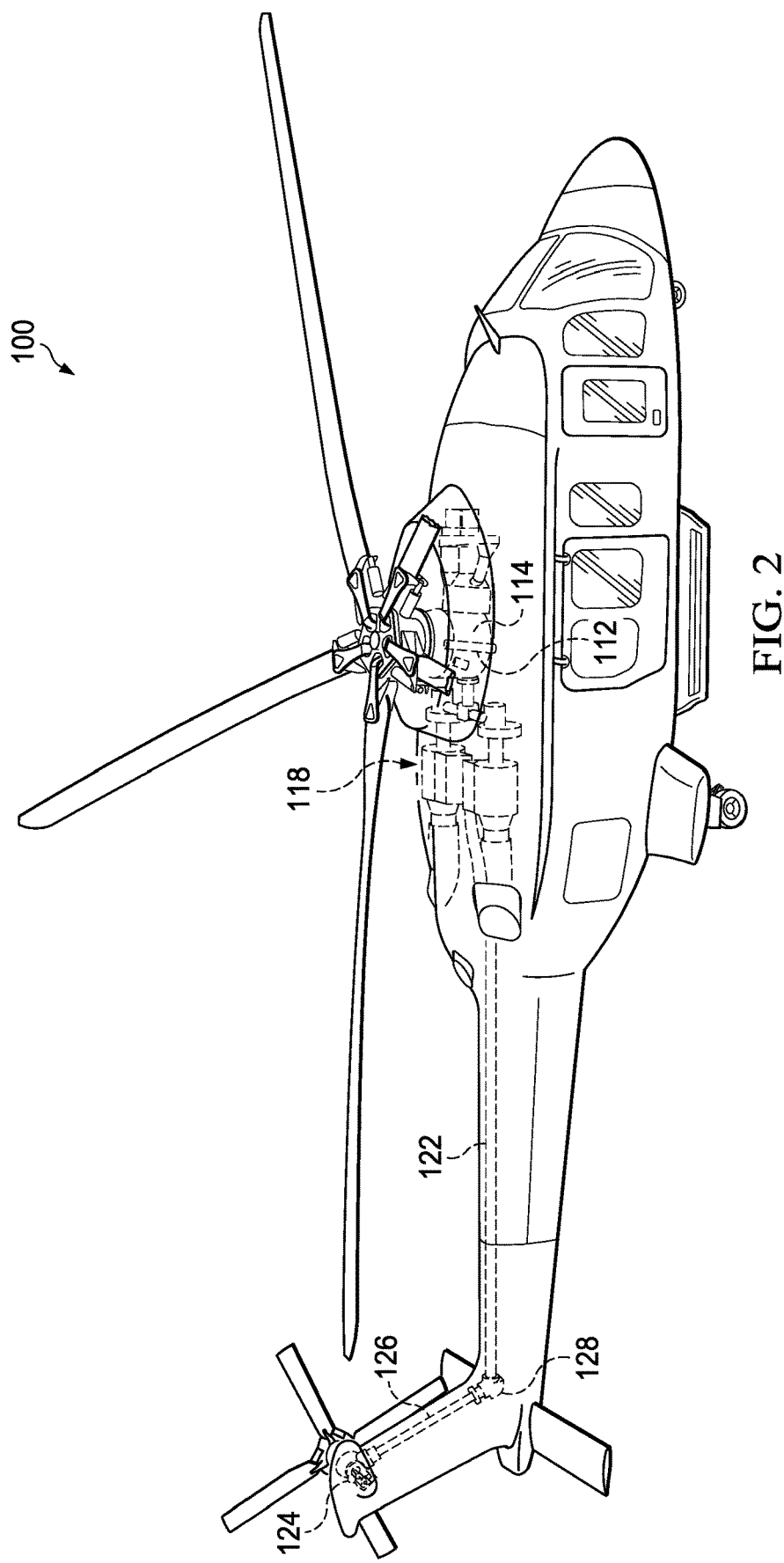
FIG. 2 shows a partial cross-section, perspective view of a helicopter according to an embodiment of the present application.

For example, FIG. 2 shows a partial cross-section perspective view of aircraft 100 that includes additional detail of the present invention. Aircraft 100 further includes a rotor mast 112, which is connected to the main rotor gearbox (MRGB) 114. A tail rotor drive shaft 122 transmits mechanical rotation to the tail rotor gearbox 124, which is connected via tail rotor drive shaft 126 and intermediate gear box 128.

Figure 3:
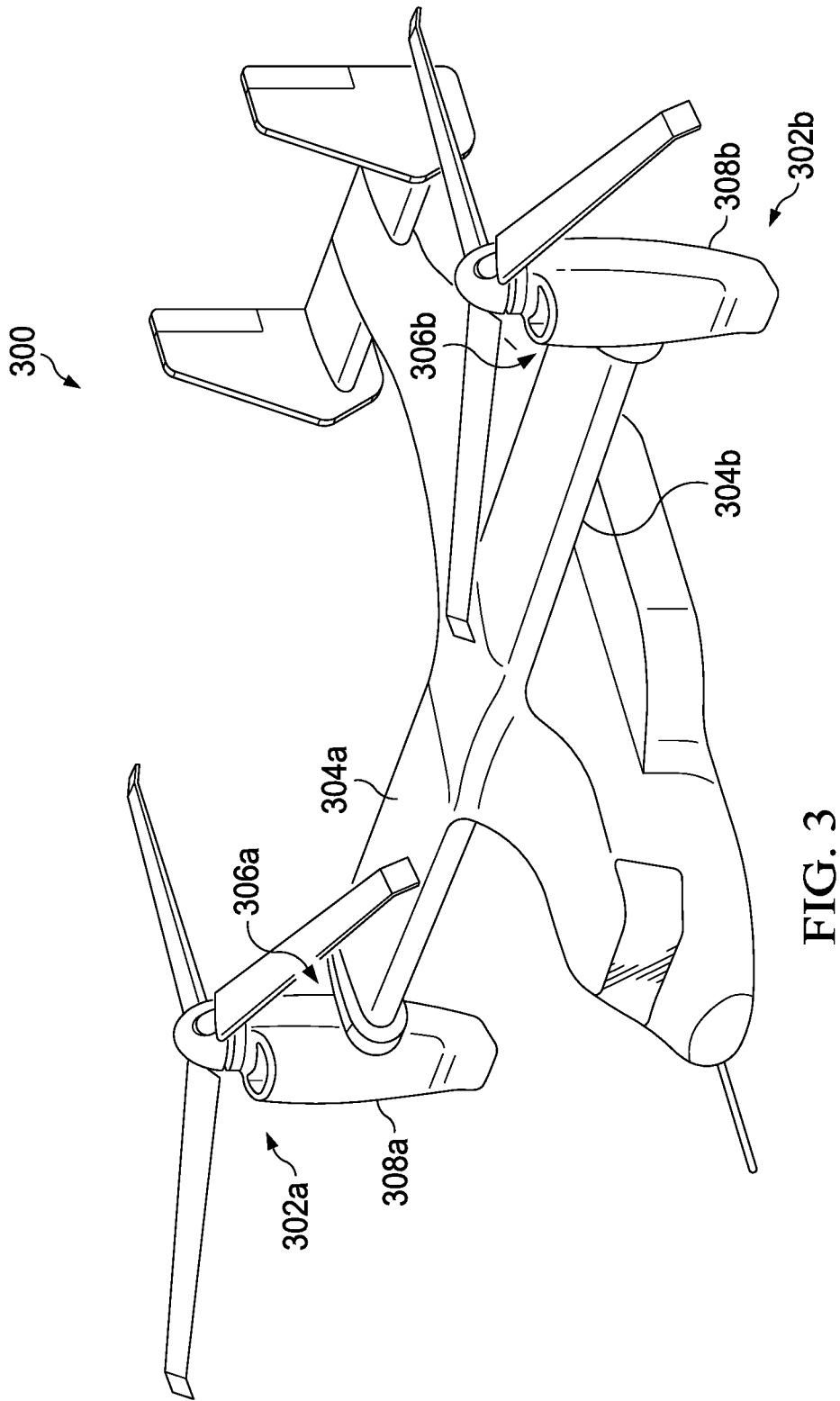
FIG. 3 shows a perspective view of a tiltrotor aircraft that can use the present application.

FIG. 3 shows a tiltrotor aircraft 300 that utilizes the system in accordance with the present application. Tiltrotor aircraft 300 includes tilt rotor assemblies 302a and 302b that are carried by wings 304a and 304b, and are disposed at end portions 306a and 306b of wings 304a and 304b, respectively. Tilt rotor assemblies 302a and 302b include nacelles 308a and 308b, which carry the engines and transmissions of tiltrotor aircraft 300. Tilt rotor assemblies 302a and 302b move or rotate relative to wings 304a and 304b between a helicopter or hover mode in which tilt rotor assemblies 302a and 302b are tilted upward, such that tiltrotor aircraft 300 flies like a conventional helicopter; and an airplane or cruise mode in which tilt rotor assemblies 302a and 302b are tilted forward, such that tiltrotor aircraft 300 flies like a conventional propeller driven aircraft. A geared shaft extends inside the lead edge of wings 304a and 304b to connect the right tilt rotor assembly 302a with the left tilt rotor assembly 302b to insure they stay aligned with each other as they articulate from helicopter mode to airplane mode and back.

Figure 4:
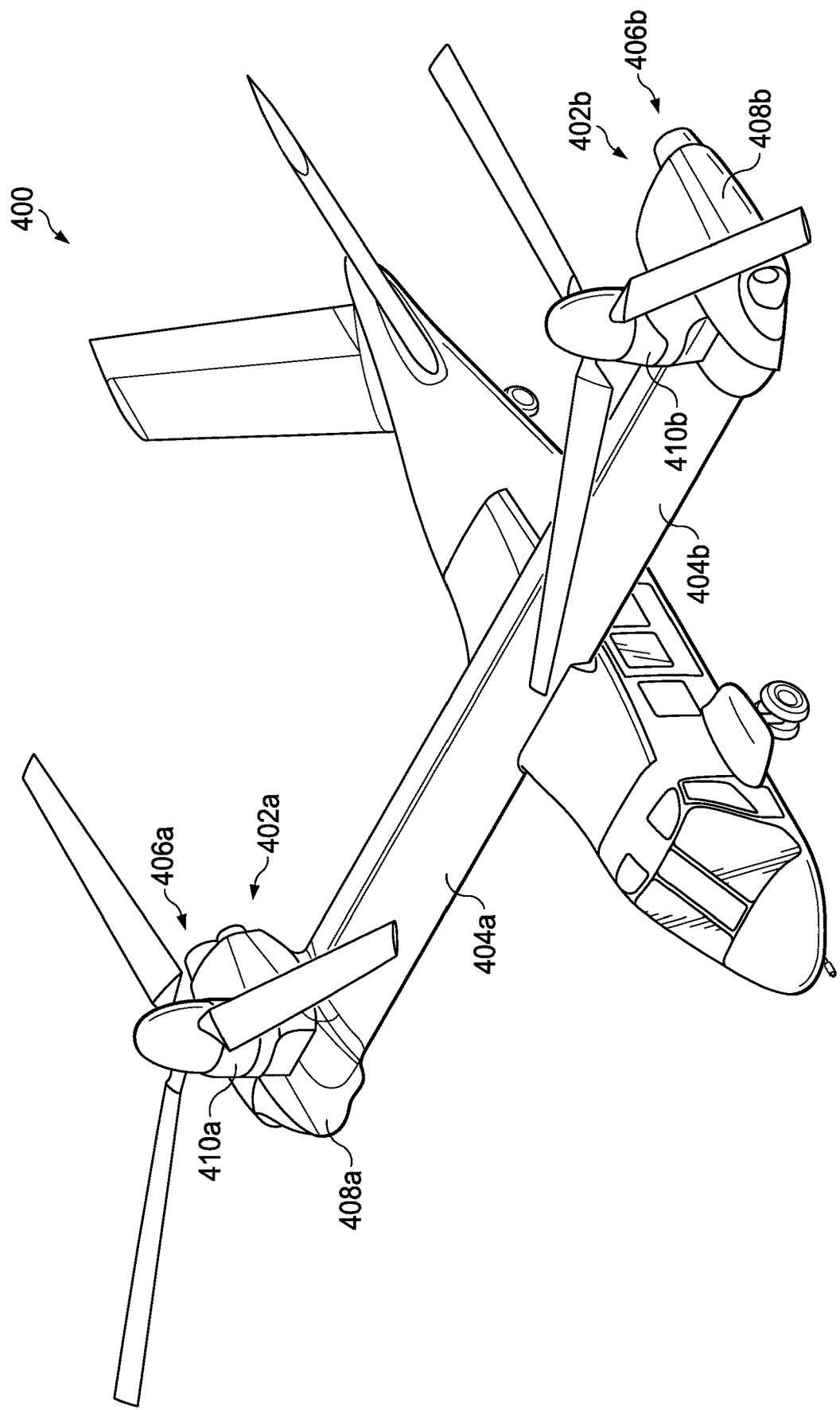
FIG. 4 shows a perspective view of another tiltrotor aircraft that can also use the present application.

FIG. 4 shows another tiltrotor aircraft 400 that utilizes the system in accordance with the present application. Tiltrotor aircraft 400 includes tilt rotor assemblies 402a and 402b that are carried by wings 404a and 404b, and are disposed at end portions 406a and 406b of wings 404a and 404b, respectively. Tilt rotor assemblies 402a and 402b include nacelles 408a and 408b, which include the engines and transmissions of tiltrotor aircraft 400. In this embodiment, the engines are fixed to the wing and do not rotate, rather, only the pylons 410a and 410b with the tilt rotor assemblies 402a and 402b rotate. Tilt rotor assemblies 402a and 402b move and rotate relative to wings 404a and 404b and the nacelles 408a and 408b. The tilt rotor assemblies 402a and 402b do not move relative to the wings 404a and 404b. Instead, during the transition between a helicopter or hover mode only the pylons 410a and 410b with the tilt rotor assemblies 402a and 402b rotate to redirect the thrust from the tilt rotor assemblies 402a and 402b. The tiltrotor aircraft 400 is still able to fly like a conventional helicopter; and an airplane or cruise mode in which one of the rotors are tilted forward, such that tiltrotor aircraft 400 flies like a conventional propeller driven aircraft. To keep pylons 410a and 410b aligned with each other during transition, a geared shaft extends inside the lead edge of wings 404a and 404b to connect the right pylon 410a with the left pylon 410b.

The leading edges of aircraft structures such as the tail fin of aircraft 100, and the wings of tiltrotor aircraft 300 and 400 are susceptible to damage by strikes by foreign objects in flight, particularly bird strikes. These types of aircraft structures may house a shaft in a space enclosed by the leading edge of, e.g., the tail fin, as is the case in, for example, the Bell Relentless 525. A shaft, such as a tail rotor shaft, must be protected from excessive damage by foreign object strikes to maintain flightworthiness, suggesting the use of strong metals such as titanium or steel with thick cross-sections. At the same time, weight and performance considerations point to the use of lightweight materials consistent with flightworthiness and safety, such as aluminum. In addition, maintenance personnel need to have access to the shaft for maintenance and other purposes.

One embodiment of the present invention uses ribs such as T-, L-, C-, or D-ribs or a combination thereof at strategic locations on the aircraft vertical fin drive shaft cover to produce an optimal structural energy band. The protective cover using these ribs is capable of effectively deflecting foreign objects and/or withstanding an impact that dents the surface (e.g., birds, debris) and protecting an aircraft tail rotor drive shaft from impact contact. It was found that use of, e.g., T-ribs, produces a superior bending stiffness compliance with improved energy band distribution and impulse during impact.

Embodiments of the present invention also include aircraft structures that use aluminum, steel, and/or titanium to mitigate damage to leading edges, including tail fin leading edges encompassing tail rotor shafts, by foreign object strikes during flight, particularly bird strikes.

Figure 5:
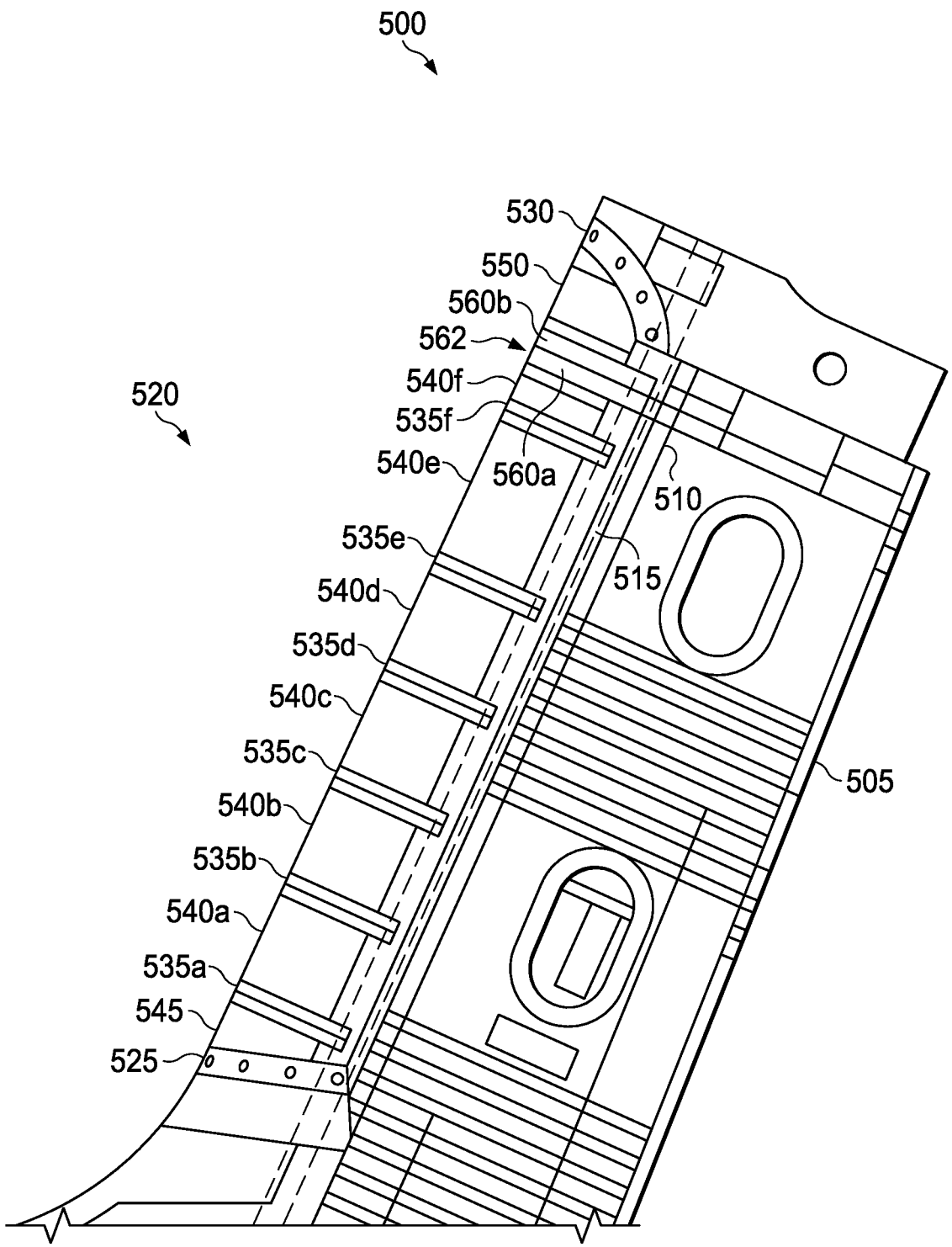
FIG. 5 shows a side view of an embodiment of the invention.

FIG. 5 illustrates an aircraft structure 500, a helicopter tail fin, which includes an aft spar 505, a forward spar 510, a tail rotor shaft 515, and a door 520 that encompasses tail rotor shaft 515, an inner support 525 and an outer support 530. As used herein, "inner" refers to the portion of the aircraft structure 500 closest to the aircraft component to which the aircraft structure is attached (also called the "root" herein), and "outer" refers to the portion of the aircraft structure 500 farthest away from the aircraft component to which the aircraft structure is attached. For example, if the aircraft structure 500 is a rotorcraft tail fin, the inner support 525 is included in the portion of the tail fin that is closest to the tail boom (the root of the tail boom), and the outer support 530 is included in the portion of the tail fin that is farthest away from the tail boom. In another example, if the aircraft structure 500 is a wing, the inner support 525 is included in the portion of the wing closest to the fuselage (the root of the wing), and the outer support 530 is included in the portion of the tail fin that is farthest away from the fuselage. The inner support 525 is proximate to the root of the aircraft structure 500, and the outer support 530 is proximate to the outer end of the aircraft structure 500. The door 520 may be hinged on the same side of the tail fin as that on which the tail rotor is mounted, and includes door ribs and door sheets as described herein; however, it may be hinged on any side of the door. A number of door ribs, represented in FIG. 5 by ribs 535a, 535b, 535c, 535d, 535e, and 535f, are disposed between the inner support 525 and the outer support 530 and are formed to give shape to the portion of the leading edge between the inner support 525 and the outer support 530. The door ribs 535a-535f may be, e.g., T-ribs. The skilled artisan will recognize that the ribs may all be T-ribs, L-ribs, C-ribs, D-ribs, or some combination of different types of ribs, depending on specific space and structural needs, and that two back-to-back L-ribs can form a T-rib. One or more door sheet(s) of a first material, here shown as door sheets 540a, 540b, 540c, 540d, 540e, and 540f, are attached to the door ribs 535a-535f and form a middle portion of the leading edge. The first material of sheet(s) 540a-540f may be, for example, aluminum, steel, titanium, or composite. One or more inner sheet(s) of a second material may be attached to the inner support 525 to form an inner portion of the leading edge, shown here as sheet 545. The second material of sheet 545 may be, for example, aluminum, steel, titanium or composite. One or more outer sheet(s) of a third material are attached to the outer support 530 to form an outer portion of the leading edge, shown here as sheet 550. The third material of sheets 540a-540f may be, for example, aluminum, titanium, steel, or composite. The sheets 545 and 550 protect the aircraft structure 500 and the tail rotor shaft 515 at the aircraft structure root and the outer end of the aircraft structure, where the tail rotor is placed, and the sheets 540a-540f protect the tail rotor shaft 515 along its length inside the length of the door. The sheets 540a-540f, 545, and 550 protect by absorbing a portion of the kinetic energy of a colliding object by crumpling enough to protect the aircraft structure 500 without impinging on the enclosed tail rotor shaft 515 or other components of the tail fin. Additional structural ribs 560a, 560b are positioned on either side of the opening 562 to strengthen the outer end of the door 520 at the outer support 530. The inner support, the one or more inner sheets, the outer support, the one or more outer sheets, the one or more ribs, and the one or more door sheets are disposed to mitigate damage from a collision with a foreign object by absorbing kinetic energy from a collision.

Figure 6:
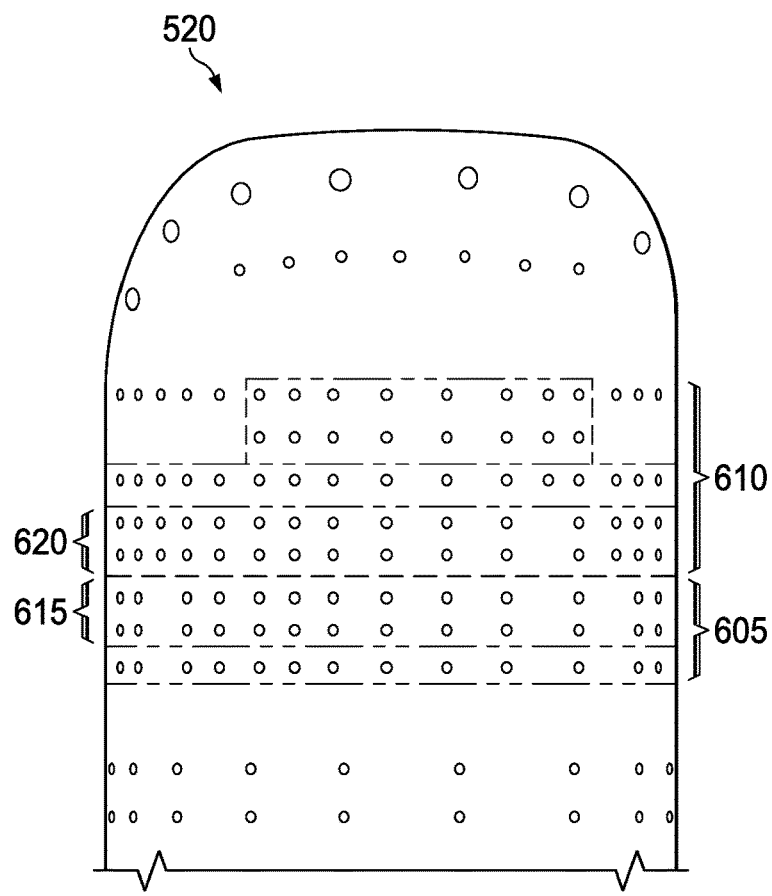
FIG. 6 shows a front view of the outer portion of an embodiment of the invention.
Figure 7:
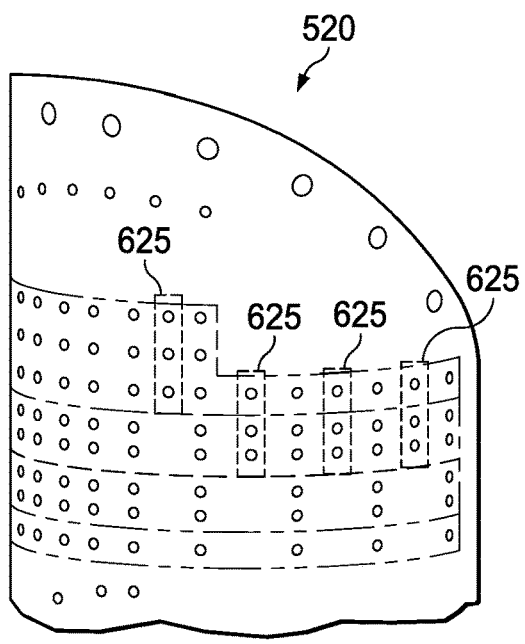
FIG. 7 shows a first side view of the outer portion of an embodiment of the invention.
Figure 8:
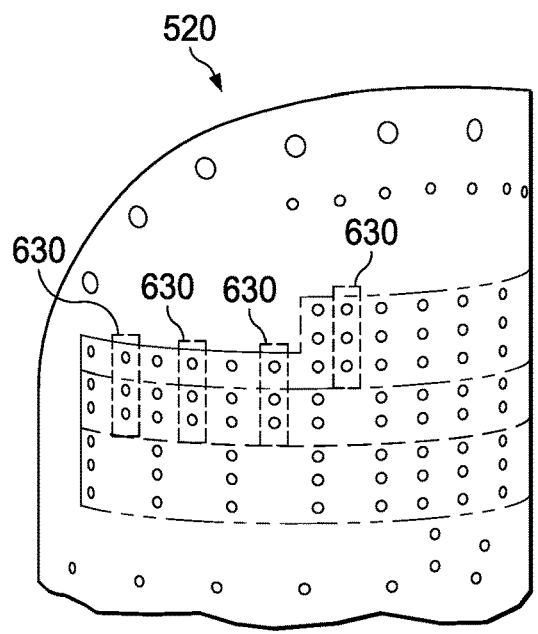
FIG. 8 shows a second side view of the outer portion of an embodiment of the invention.

FIGS. 6-8 show details at the outer support 530. FIG. 6 is a view of the upper part of the door 520 from directly in front of the leading edge. Doubler 605 is a component that reinforces the area at the outer edge of the door 520. Doubler 610 is a component that reinforces that area immediately beyond the outer edge of the door 520. Area 615 is the portion of the door 520 that is attached to a component forming the outer edge of the door. Area 620 is the portion of the leading edge of the aircraft structure immediately beyond the outer edge of the door 520. In FIGS. 7 and 8, fasteners 625 and 630 are additional fasteners for the doubler 610 that are judiciously positioned to optimize strength and energy absorption. The doublers 605 and 610 may include aluminum.

Figure 9:
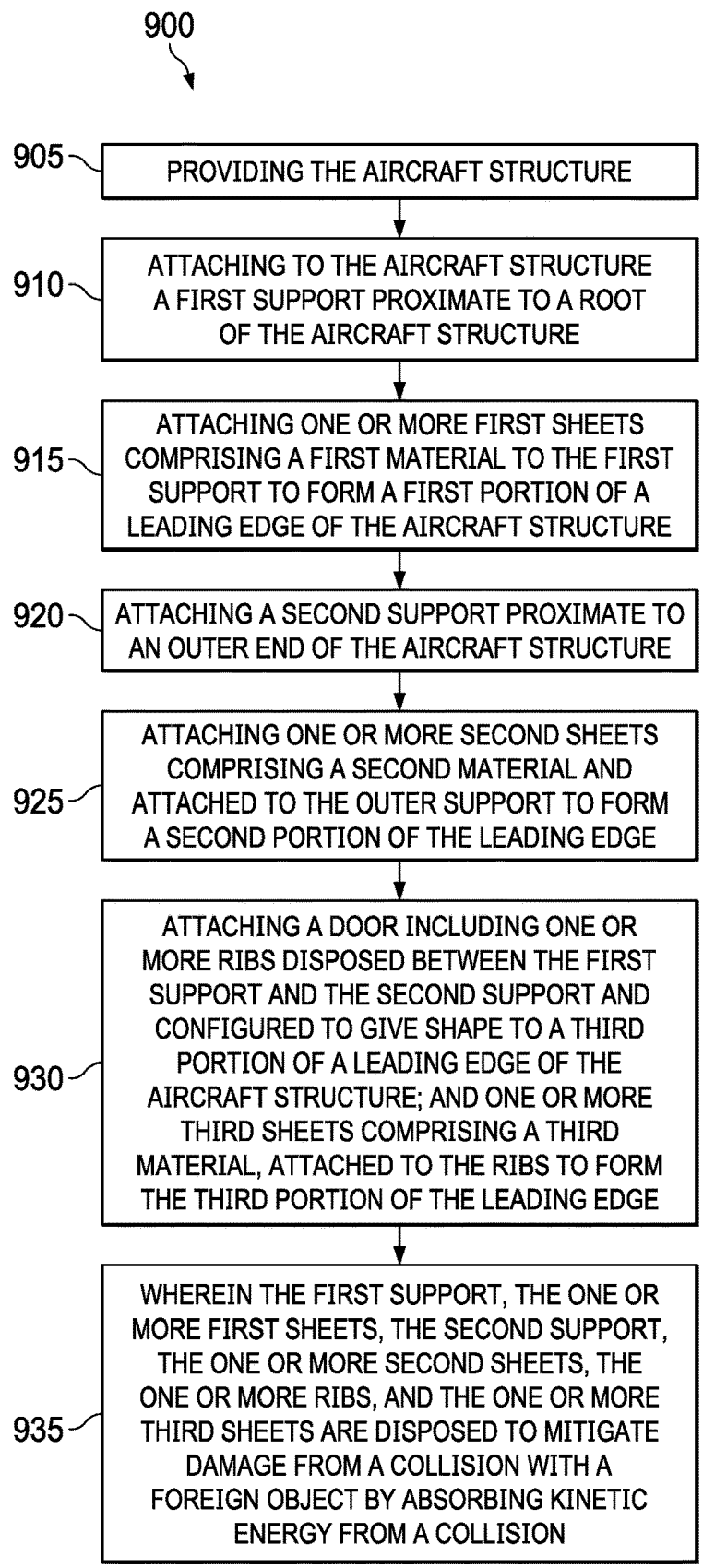
FIG. 9 is a flow chart which illustrates a method embodiment of the invention.

FIG. 9 depicts a method embodiment of the present invention. Method 900 of protecting an aircraft structure from collisions with foreign objects includes providing the aircraft structure in block 905, that includes a component, such as a shaft that needs to be protected. Method 900 further includes in block 910 attaching to the aircraft structure a first support proximate to a root of the aircraft structure. Attaching one or more first sheets comprising a first material to the first support to form a first portion of a leading edge of the aircraft structure is included in block 915. In block 920, a second support is attached proximate to an outer end of the aircraft structure. Block 925 includes attaching one or more second sheets comprising a second material and attached to the outer support to form a second portion of the leading edge. Block 930 includes attaching a door including one or more ribs disposed between the first support and the second support and configured to give shape to a third portion of a leading edge of the aircraft structure; and one or more sheets comprising a third material, attached to the ribs to form the third portion of the leading edge. Finally, block 935 includes that the first support, the one or more first sheets, the second support, the one or more second sheets, the one or more ribs, and the one or more third sheets are disposed to mitigate damage from a collision with a foreign object by absorbing kinetic energy from a collision.

While embodiments of the present invention are discussed herein primarily in terms of a helicopter tail fin, the aircraft structure 500 may be other structures such as a vertical stabilizer, a horizontal stabilizer, a wing, a winglet, a canard, a rotor blade, or a propeller blade.

One skilled in the art of aircraft structures will recognize that the present invention is useful in protecting aircraft structures from collisions by foreign objects.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words "means for" or "step for" are explicitly used in the particular claim.

What is claimed is:

1. An aircraft structure protected from collisions with foreign objects comprising:
    a first support proximate to a root of the aircraft structure;
    one or more first sheets comprising a first material and attached to the first support to form a first portion of a leading edge of the aircraft structure;
    a second support proximate to an outer end of the aircraft structure;
    one or more second sheets comprising a second material and attached to the second support to form a second portion of the leading edge; and
    a hinged leading-edge door comprising:
        one or more leading-edge door ribs disposed between the first support and the second support and configured to give shape to a third portion of a leading edge of the aircraft structure, wherein the one or more leading-edge door ribs are configured to enclose a rotor shaft at least partly within the leading edge; and one or more third sheets comprising a third material, attached to the one or more leading-edge door ribs to form the third portion of the leading edge;

wherein the first support, the one or more first sheets, the second support, the one or more second sheets, the one or more leading-edge door ribs, and the one or more third sheets are disposed to mitigate damage from a collision with a foreign object by absorbing kinetic energy from the collision.

2. The structure of claim 1, wherein the aircraft structure is a tail fin or a wing.

3. The structure of claim 1, wherein the one or more leading-edge door ribs comprise aluminum, steel, titanium, or composite.

4. The structure of claim 1, wherein the one or more leading-edge door ribs comprise at least one T-rib, L-rib, C-rib, or D-rib.

5. The structure of claim 1, wherein the first material comprises aluminum, steel, titanium, or composite.

6. The structure of claim 1, wherein the second material comprises aluminum, titanium, steel, or composite.

7. The structure of claim 1, wherein the third material comprises aluminum, titanium, steel, or composite.

8. A rotorcraft comprising:
a fuselage;
one or more engines coupled to the fuselage; and
an aircraft structure protected from collisions with foreign object impacts, coupled to the fuselage and comprising:
a first support proximate to a root of the aircraft structure;
one or more first sheets comprising a first material and attached to the first support to form a first portion of a leading edge of the aircraft structure;
a second support proximate to an outer end of the aircraft structure;
one or more second sheets comprising a second material and attached to the second support to form a second portion of the leading edge; and
a hinged leading-edge door comprising:
one or more leading edge-door ribs disposed between the first support and the second support and configured to give shape to a third portion of a leading edge of the aircraft structure, wherein the one or more leading-edge door ribs are configured to enclose a rotor shaft at least partly within the leading edge; and
one or more third sheets comprising a third material, attached to the one or more leading-edge door ribs to form the third portion of the leading edge;
wherein the first support, the one or more first sheets, the second support, the one or more second sheets, the one or more leading-edge door ribs, and the one or more third sheets are disposed to mitigate damage from a collision with a foreign object by absorbing kinetic energy from the collision, and wherein the hinged leading-edge door is configured and disposed to allow inspection and maintenance of the rotor shaft when the hinged leading-edge door is opened.

9. The rotorcraft of claim 8, wherein the aircraft structure is a tail fin or a wing.

10. The rotorcraft of claim 8, wherein the one or more leading-edge door ribs comprise aluminum, steel, titanium, or composite.

11. The rotorcraft of claim 8, wherein the one or more leading-edge door ribs comprise at least one T-rib, L-rib, C-rib, or D-rib.

12. The rotorcraft of claim 8, wherein the first material comprises aluminum, steel, titanium, or composite.

13. The rotorcraft of claim 8, wherein the second material comprises aluminum, steel, titanium, or composite.

14. The rotorcraft of claim 8, wherein the third material comprises aluminum, steel, titanium, or composite.

15. A method of protecting an aircraft structure from collisions with foreign objects, comprising:
providing the aircraft structure;
attaching to the aircraft structure a first support proximate to a root of the aircraft structure;
attaching one or more first sheets comprising a first material to the first support to form a first portion of a leading edge of the aircraft structure;
attaching a second support proximate to an outer end of the aircraft structure;
attaching one or more second sheets comprising a second material and attached to the outer support to form a second portion of the leading edge; and
attaching a hinged leading-edge door comprising:
one or more leading-edge door ribs disposed between the first support and the second support and configured to give shape to a third portion of a leading edge of the aircraft structure, wherein the one or more leading-edge door ribs are configured to enclose a rotor shaft at least partly within the leading edge; and
one or more third sheets comprising a third material, attached to the one or more leading-edge door ribs to form the third portion of the leading edge;
wherein the first support, the one or more first sheets, the second support, the one or more second sheets, the one or more leading-edge door ribs, and the one or more third sheets are disposed to mitigate damage from a collision with a foreign object by absorbing kinetic energy from the collision, and wherein the hinged leading-edge door is configured and disposed to allow inspection and maintenance of the rotor shaft when the hinged leading-edge door is opened.

16. The method of claim 15, wherein the aircraft structure is a tail fin or a wing.

17. The method of claim 15, wherein the one or more leading-edge door ribs comprise aluminum, steel, titanium, or composite.

18. The method of claim 15, wherein the one or more leading-edge door ribs comprise at least one T-rib, L-rib, C-rib, or D-rib.

19. The method of claim 15, wherein the first material comprises aluminum, steel, titanium, or composite.

20. The method of claim 15, wherein the second material comprises aluminum, titanium, steel, or composite.

* * * * *